United States Patent
Schumacher et al.

(10) Patent No.: US 12,539,481 B2
(45) Date of Patent: Feb. 3, 2026

(54) FILTER HAVING MEDIA PACKS ARRANGED IN A V-SHAPE AND PROTECTIVE GRID

(71) Applicant: Carl Freudenberg KG, Weinheim (DE)

(72) Inventors: Sascha Schumacher, Wald-Michelbach (DE); Patrick Weber, Weinheim (DE); Thomas Schroth, Bobenheim-Roxheim (DE); Renate Tapper, Bensheim (DE); Florian Fritz, Moerlenbach (DE)

(73) Assignee: CARL FREUDENBERG KG, Weinheim (DE)

( * ) Notice: Subject to any disclaimer, the term of this patent is extended or adjusted under 35 U.S.C. 154(b) by 239 days.

(21) Appl. No.: 18/348,375

(22) Filed: Jul. 7, 2023

(65) Prior Publication Data
US 2024/0017198 A1    Jan. 18, 2024

(30) Foreign Application Priority Data
Jul. 14, 2022    (DE) ...................... 10 2022 117 649.5

(51) Int. Cl.
*B01D 46/00*    (2022.01)
*B01D 46/121*    (2022.01)
(Continued)

(52) U.S. Cl.
CPC ..... *B01D 46/0006* (2013.01); *B01D 46/0002* (2013.01); *B01D 46/121* (2022.01);
(Continued)

(58) Field of Classification Search
CPC ............ B01D 46/0002; B01D 46/0005; B01D 46/0006; B01D 46/10; B01D 46/12;
(Continued)

(56) References Cited

U.S. PATENT DOCUMENTS

| | | | |
|---|---|---|---|
| 6,790,261 B1 * | 9/2004 | Delts ...................... | B01D 46/10 55/501 |
| 2007/0095037 A1 * | 5/2007 | McLamb, III ......... | B01D 46/10 55/495 |

(Continued)

FOREIGN PATENT DOCUMENTS

| | | |
|---|---|---|
| CN | 101158364 A | 4/2008 |
| CN | 202700287 U | 1/2013 |

(Continued)

*Primary Examiner* — Robert Clemente
(74) *Attorney, Agent, or Firm* — LEYDIG, VOIT & MAYER, LTD.

(57) ABSTRACT

A cassette filter including a plurality of filter media packs, a frame for receiving the filter media packs, and protective grids. Two filter media packs in each case are arranged in a v-shape, and a gas flows through the filter media packs from a dirty gas side of the filter to a clean gas side of the filter in order to clean the gas. A respective protective grid of the protective grids is arranged on each filter media pack on the clean gas side. The protective grids have a grid structure with substantially closed curves of different sizes arranged centrically around at least one centre of the protective grid and with a plurality of connectors, which are oriented radially with respect to the centre of the protective grid and connect the closed curves to one another.

12 Claims, 3 Drawing Sheets

(51) Int. Cl.
*B01D 46/52* (2006.01)
*B01D 46/58* (2022.01)

(52) U.S. Cl.
CPC .......... *B01D 46/521* (2013.01); *B01D 46/58* (2022.01); *B01D 2265/06* (2013.01)

(58) Field of Classification Search
CPC .... B01D 46/121; B01D 46/521; B01D 46/58; B01D 2265/06
See application file for complete search history.

(56) References Cited

U.S. PATENT DOCUMENTS

| | | |
|---|---|---|
| 2011/0005177 A1 | 1/2011 | Pfannenberg |
| 2015/0224433 A1 | 8/2015 | Lans |
| 2015/0290573 A1 | 10/2015 | Hugert |

FOREIGN PATENT DOCUMENTS

| | | |
|---|---|---|
| CN | 104755150 A | 7/2015 |
| CN | 108355425 A | 8/2018 |
| DE | 202018102943 U1 | 6/2018 |
| EP | 1270059 A1 | 1/2003 |
| EP | 3831461 A1 | 6/2021 |

* cited by examiner

FILTER HAVING MEDIA PACKS ARRANGED IN A V-SHAPE AND PROTECTIVE GRID

CROSS REFERENCE TO RELATED APPLICATIONS

This application claims benefit to German Patent Application No. DE 10 2022 117 649.5, filed on Jul. 14, 2022, which is hereby incorporated by reference herein.

FIELD

The invention relates to a filter having a plurality of filter media packs, having a frame for receiving the filter media packs, and having protective grids.

BACKGROUND

In gas turbines, compressors, air conditioning and ventilation systems, a wide variety of filters are used for cleaning supply air flows, e.g. cassette filters.

EP 3 831 461 A1 discloses a filter having a plurality of filter media packs, wherein every two filter media packs are arranged in a v-shape and a gas flows through the filter media packs from a dirty gas side of the filter to a clean gas side of the filter in order to clean said gas. Such filters are also referred to as V-cell filters or V-bank filters. The filter has a frame for receiving the filter media packs with protective grids for the filter medium, wherein a respective protective grid is arranged on each filter media pack on the clean gas side. Such protective grids are also referred to as burst protection grids. By means of the protective grids, the filter medium can be held in its position and protected from impairment and damage, in particular during assembly and during operation. The protective grids prevent parts of the filter medium from becoming detached and entering downstream systems where they could cause damage, such as in gas turbines. The structure of the grid should be optimized with respect to stability and requirement for materials, for which purpose an elaborate moment analysis is carried out.

SUMMARY

In an embodiment, the present disclosure provides a cassette filter comprising a plurality of filter media packs, a frame for receiving the filter media packs, and protective grids. Two filter media packs in each case are arranged in a v-shape, and a gas flows through the filter media packs from a dirty gas side of the filter to a clean gas side of the filter in order to clean the gas. A respective protective grid of the protective grids is arranged on each filter media pack on the clean gas side. The protective grids have a grid structure with substantially closed curves of different sizes arranged centrically around at least one centre of the protective grid and with a plurality of connectors, which are oriented radially with respect to the centre of the protective grid and connect the closed curves to one another.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
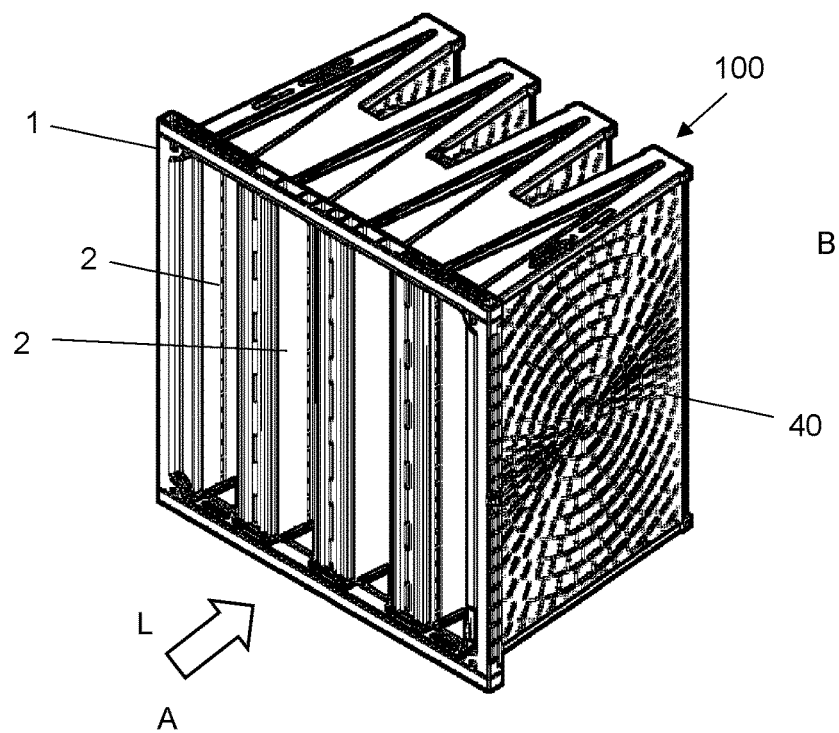
FIGS. 1a and 1b illustrate a filter according to an embodiment of the invention in two views.
Figure 1:
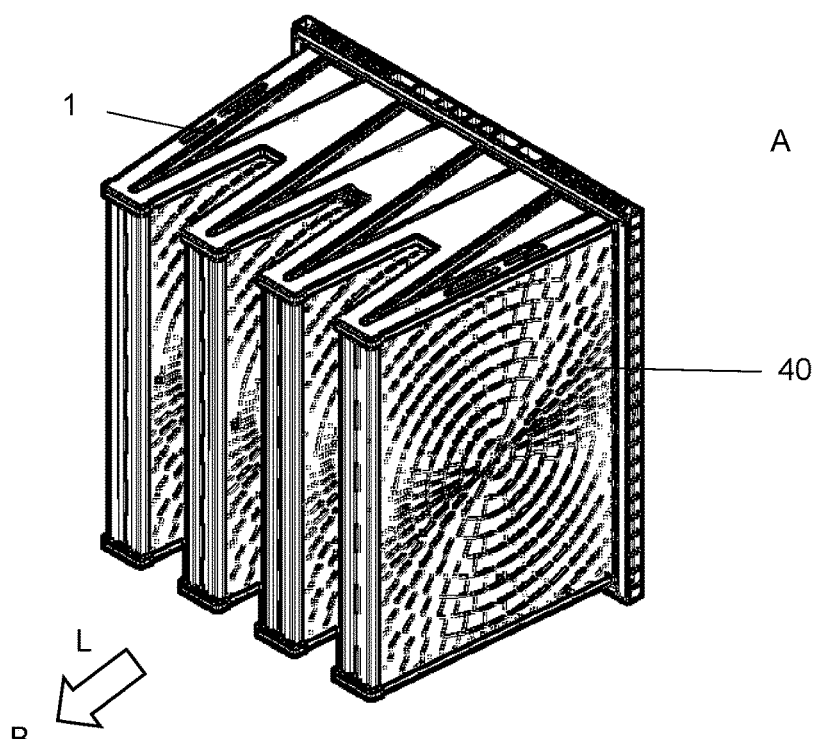

In an embodiment, the present invention provides a filter which has a particularly stable protective grid that is advantageous in terms of production engineering, while at the same time having a simple construction and a low pressure loss.

According to an embodiment of the invention, it has been recognized as advantageous to use protective grids with centrically aligned bar structures, e.g. concentric or spiral-shaped bar structures arranged around a centre.

An embodiment of the invention relates to a cassette filter having a plurality of filter media packs, wherein two filter media packs in each case are always arranged in pairs in a v-shape, referred to as a V-cell filter or also as a V-bank filter. A gas flows through the filter media packs from a dirty gas side of the filter to a clean gas side of the filter in order to clean said gas. The filter furthermore has a frame for receiving the filter media packs and protective grids, wherein a respective protective grid is arranged on each filter media pack on the clean gas side.

According to an embodiment of the invention, the protective grids have a grid structure with substantially closed curves of different sizes arranged centrically around at least one centre of the protective grid, e.g. concentric ring-shaped curves or spiral-shaped curves, and have a multiplicity of connectors, which are oriented radially with respect to the centre of the protective grid and connect the closed curves to one another. Both the curves and the connectors form the bars of the protective grid. The protective grids thus have a spider-web-shaped grid structure.

Advantageously, forces acting on the protective grid can be distributed well and uniformly by this grid structure and then dissipated into the frame of the cassette filter. In other words: the design according to embodiments of the invention of the protective grid result in a more uniform distribution of forces on all four sides of the frame, bringing about more homogeneous stress distribution in the protective grid and thus allowing, for example, narrower structures of the bars with the same functionality.

Here, substantially closed curves means that the curves can have small interruptions at some points. The curves are therefore not continuous or coherent in the mathematical sense but form a bar of the grid structure which is characterized by closed extension around the centre of the protective grid.

Calculations have shown that isolated interruptions in the closed curves do not adversely affect the stability of the protective grid.

In an embodiment of the filter, the closed curves are designed as concentric rings or ovals, which can also be referred to as an ovoid curve or ovoid line, in particular as circles or ellipses.

In an embodiment of the filter, the closed curves are designed as concentric polygons, in particular with at least six corners, for example as equilateral hexagons.

In an embodiment of the filter, the closed curves are designed as centric spirals, for example as an Archimedean spiral.

In an advantageous and preferred further development of the filter according to an embodiment of the invention, the connectors between in each case a first closed curve and a second closed curve located further away from the centre are arranged radially offset with respect to connectors between the second closed curve and a subsequent closed curve located further away from the centre, such that no struts leading in a straight line from the centre of the protective grid to the edge of the protective grid are formed. Moreover, there are no straight struts leading from a first edge to another edge of the protective grid. This configuration has the advantage that a large number of connectors is used for the distribution of forces acting on the protective grid and that the forces are distributed uniformly. As a result, the cross section of the closed curves and the connectors can be kept small and material can be saved.

In a further development of the filter, the closed curves in the edge regions of the protective grids are formed by segments of the curves, for example in the case of circular curves and a rectangular protective grid by partial circles in the region of the four corners of the protective grid. In this way, the centric structure can be continued into the edge region. This is particularly significant in the case of a rectangular outer contour of the protective grids.

In the filter, at least some of the closed curves can have isolated interruptions, in particular in the edge regions of the protective grids.

In different variants of the filter, the closed curves can be arranged centrically around one, two, three or four centres. The flow of force in the protective grid can thus be configured in an advantageous way. Two or three or four centres are preferred if the protective grid has a large surface area and/or if the protective grid has an unequal edge length ratio (length-width) and/or if the grid structure is to be configured with particularly small cross sections of the bars (i.e. of the closed curves and the connectors).

In a further development of the filter, each protective grid is surrounded by an edge strut, which can be interrupted. The edge strut increases the stability of the protective grid, wherein the interruptions of the edge strut allow material to be saved where it is not absolutely necessary.

In an embodiment of the filter, each protective grid is formed in one piece, in particular as an injection-moulded part, and is thus of particularly favourable configuration in terms of production engineering: by virtue of the centric design, the protective grid is particularly suitable as an injection-moulded part since it can be filled from the centre by a so-called spider-type runner system. The occurrence of weld lines is thereby reduced, resulting in a higher strength of the protective grid.

Furthermore, the tensions in the protective grid are reduced by the filling from the centre, advantageously bringing about a high bursting strength and low distortion of the protective grid.

In a further development of the filter, the protective grids are connected to the frame in a materially bonded manner, for example by adhesive bonding or casting. A particularly reliable and durable connection is thereby achieved. If each protective grid has an edge strut, the materially bonded connection can be in the region of the edge struts.

Embodiments of the invention described and the advantageous developments of embodiments of the invention which are described also represent advantageous developments of the invention in combination with one another, where this is technically worthwhile.

As regards further advantages and embodiments of the invention which are advantageous in terms of design and functionality, attention is drawn to the description of exemplary embodiments with reference to the accompanying figures.

Embodiments of the invention will be explained in more detail with reference to the accompanying figures, provided by way of example. Elements and components which correspond to one another are provided with the same reference signs in the figures. To improve the clarity of the figures, true-to-scale representation has been dispensed with.

FIGS. 1a and 1b show a filter 100 according to an embodiment of the invention in two perspective views.

The cassette filter 100 has eight filter media packs 2 which can be formed from pleated filter medium. In each case two filter media packs 2 are always arranged in pairs in a v-shape. A gas flows through the filter media packs 2 from a dirty gas side A of the filter 100 to a clean gas side B of the filter 100 in flow direction L in order to clean said gas.

FIG. 1a shows the filter 100 from the dirty gas side A and FIG. 1b from the clean gas side B.

A frame 1 is provided to receive the filter media packs 2. The structure of the frame 1 can be seen in more detail from FIG. 2. A respective protective grid 40 is arranged on each filter media pack 2 on the clean gas side (A). The structure of the protective grids 40 can be seen in more detail from FIG. 3. By means of the protective grids 40, the filter medium of the filter medium packs 2 is held in its position, is protected from impairment and downstream systems are protected from damage.

In the embodiment shown, each protective grid 40 is formed in one piece as an injection-moulded part and is connected, for example cast, to the frame 1 in a materially bonded manner at its peripheral edge in the region of an edge strut 45.

Figure 2:
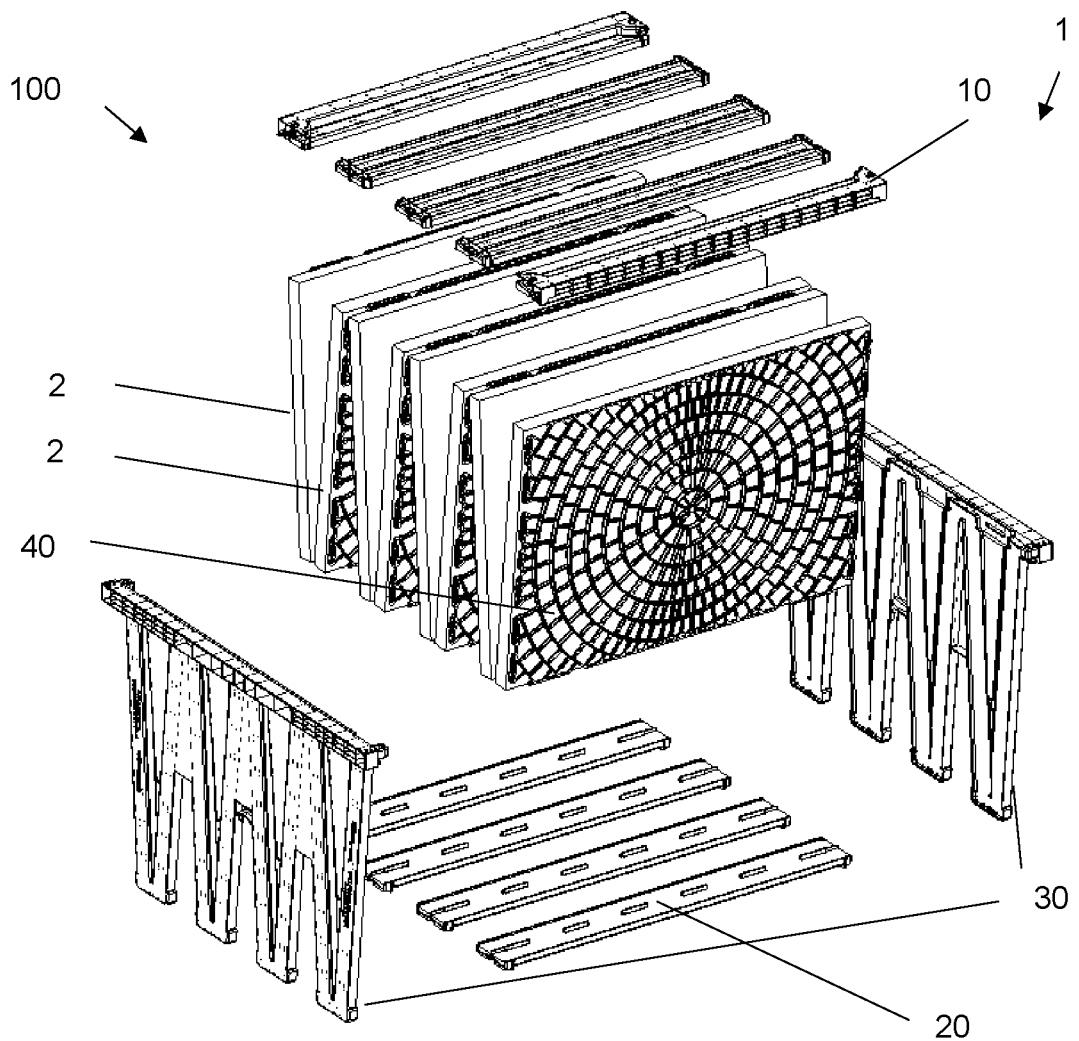
FIG. 2 illustrates an exploded view of a filter according to an embodiment of the invention.

FIG. 2 shows an exploded view of a cassette filter 100 according to an embodiment of the invention and the structure of the frame 1. The frame 1 has a head plate 10 with a plurality of crosspieces and a foot plate 20, arranged parallel thereto, with a plurality of crosspieces, and side plates 30 arranged therebetween. The filter media packs 2 are arranged between the head plate 10, foot plate 20 and side plates 30. In the exemplary embodiment shown, the head plate 10 and the foot plate 20 and the side plates 30 are each segmented and formed in multiple parts. In some embodiments, the plates 10, 20, 30 can also be of one-piece configuration.

The filter 100 can be inserted in a drawer-like manner into a rectangular drawer compartment of a filter receptacle. By means of bearing surfaces of the head plate 10, the filter 100 then rests against the filter receptacle and can be connected thereto, for example by screw fastening. It is also possible for a filter receptacle to have a plurality of compartments in order to be able to accommodate a corresponding plurality of filters 100, which are then arranged in a matrix-like manner and form what is referred to as a filter wall.

Figure 3:
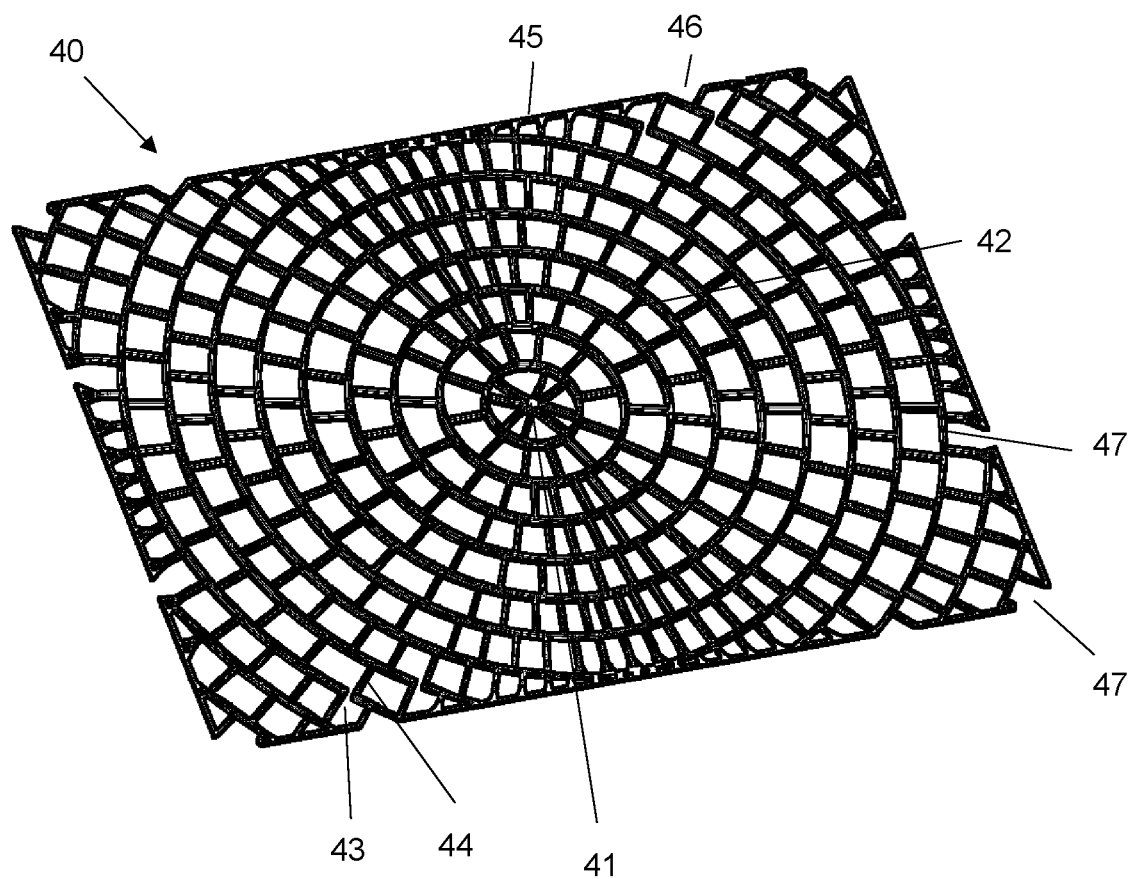
FIG. 3 illustrates a detail view of a protective grid in an embodiment.

FIG. 3 shows a detail view of a protective grid 40 in an embodiment.

The protective grid 40 has a grid structure with circular, substantially closed curves 42 of different sizes arranged concentrically around a centre 41 of the protective grid 40.

As the distance from the centre 41 of the protective grid increases, the diameter of the circular closed curves 42 increases.

The grid structure of the protective grid 40 furthermore has a multiplicity of connectors 44, which are oriented radially with respect to the centre 41 of the protective grid 40 and connect the closed curves 42 to one another.

The connectors 44 are relatively short and are arranged between a respective first and second closed curve 42 in such a way as to be radially offset with respect to connectors 44 between the second and a subsequent closed curve 42, such that no struts leading in a straight line from the centre 41 of the protective grid 40 to the edge of the protective grid 40 are formed.

In the edge regions of the protective grids 40, the closed curves 42 are formed by segments 47 of the curves 42, namely by partial circles. The concentric pattern of the closed curves 42 is thus continued into the edge region.

At least some of the closed curves 42 can have isolated interruptions 43, in particular in the edge regions of the protective grid 40, while nevertheless still being referred to as closed curves 42.

The protective grid 40 is surrounded by an edge strut 45, which forms the outer contour of the rectangular protective grid 40. The edge strut 45 can also have interruptions 46.

By means of the interruptions 43, 46, it is possible to save material without substantially reducing the stability and the burst protection effect of the protective grid 40 as long as only a few interruptions 43, 46 are provided.

FIGS. 4a-4d show basic diagrams of embodiments of a protective grid 40. For better clarity, the connectors 44 of the grid structure have been omitted.

Figures 4A, 4B, 4C, 4D:
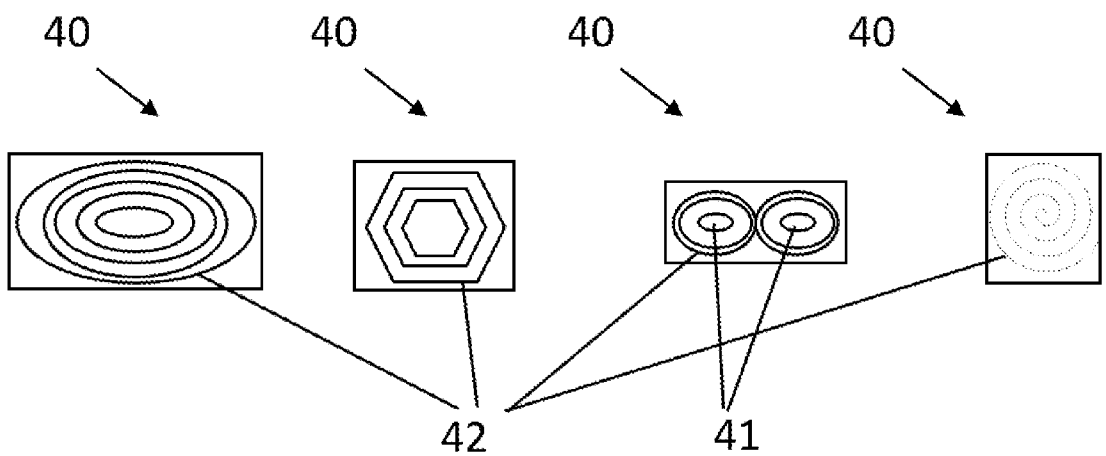
FIGS. 4a-4d illustrate basic diagrams of embodiments of a protective grid.

According to FIG. 4a, the closed curves 42 are designed as ovals. According to FIG. 4b, the closed curves 42 are designed as polygons.

According to FIG. 4c, the closed curves 42 are arranged concentrically around two centres 41.

According to FIG. 4d, the closed curves 42 are arranged spirally centrically around a centre.

The other features of the protective grids 40 can be similar to those of the protective grid 40 shown in FIG. 3.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cassette filter comprising:
   a plurality of filter media packs,
      wherein two filter media packs in each case are arranged in a v-shape, and a gas flows through the filter media packs from a dirty gas side of the filter to a clean gas side of the filter in order to clean the gas;
   a frame for receiving the filter media packs; and
   protective grids, wherein a respective protective grid of the protective grids is arranged on each filter media pack on the clean gas side,
   wherein the protective grids have a grid structure with substantially closed curves of different sizes arranged centrically around at least one centre of the protective grid and with a plurality of connectors, which are oriented radially with respect to the centre of the protective grid and connect the closed curves to one another.

2. The cassette filter according to claim 1, wherein the closed curves are designed as concentric ovals, in particular as circles or ellipses.

3. The cassette filter according to claim 1, wherein the closed curves are designed as concentric polygons or as spiral shapes.

4. The cassette filter according to claim 1, wherein the connectors between in each case a first and a second closed curve are arranged radially offset with respect to connectors between the second closed curve and a subsequent closed curve.

5. The cassette filter according to claim 1, wherein the closed curves in edge regions of the protective grids are formed by segments of the closed curves.

6. The cassette filter according to claim 1, wherein at least some of the closed curves have isolated interruptions.

7. The cassette filter according to claim 1, wherein the closed curves are arranged centrically around one, two, three or four centres.

8. The cassette filter according to claim 1, wherein each protective grid is surrounded by an interrupted edge strut.

9. The cassette filter according to claim 1, wherein each protective grid is formed in one piece.

10. The cassette filter according to claim 1, wherein the protective grids are connected to the frame in a materially bonded manner.

11. The cassette filter according to claim 6, wherein the isolated interruptions are in edge regions of the protective grids.

12. The cassette filter according to claim 9, wherein each protective grid is an injection molded part.

* * * * *